(12) United States Patent
Stella et al.

(10) Patent No.: US 12,504,334 B2
(45) Date of Patent: Dec. 23, 2025

(54) METHOD AND SYSTEM FOR CHARACTERIZING JUNCTION TEMPERATURES OF POWER DIODES OF A VOLTAGE SOURCE INVERTER

(71) Applicant: Politecnico di Torino, Turin (IT)

(72) Inventors: Fausto Stella, Motta di Costigliole (IT); Gianmario Pellegrino, Turin (IT); Giacomo Eric Armando, Costigliole di Saluzzo (IT)

(73) Assignee: Politecnico Di Torino, Turin (IT)

( * ) Notice: Subject to any disclaimer, the term of this patent is extended or adjusted under 35 U.S.C. 154(b) by 409 days.

(21) Appl. No.: 17/926,927

(22) PCT Filed: May 6, 2021

(86) PCT No.: PCT/IB2021/053840
§ 371 (c)(1),
(2) Date: Nov. 21, 2022

(87) PCT Pub. No.: WO2021/234493
PCT Pub. Date: Nov. 25, 2021

(65) Prior Publication Data
US 2023/0194353 A1 Jun. 22, 2023

(30) Foreign Application Priority Data

May 22, 2020 (IT) .................. 102020000012109

(51) Int. Cl.
*G01K 7/01* (2006.01)
*G01K 15/00* (2006.01)
*H02M 7/5387* (2007.01)

(52) U.S. Cl.
CPC ............ *G01K 7/01* (2013.01); *G01K 15/005* (2013.01); *H02M 7/53871* (2013.01); *G01K 2217/00* (2013.01)

(58) Field of Classification Search
CPC .... G01K 7/01; G01K 15/005; G01K 2217/00; H02M 7/53871
See application file for complete search history.

(56) References Cited

U.S. PATENT DOCUMENTS 3,791,217 A * 2/1974 Stout ...................... G01K 1/026
374/E1.004
2010/0327837 A1 12/2010 Tsugawa et al.
(Continued)

OTHER PUBLICATIONS

International Preliminary Report on Patentability dated Nov. 17, 2022, issued in PCT Application No. PCT/IB2021/053840, filed May 6, 2021.
(Continued)

*Primary Examiner* — Jue Zhang
(74) *Attorney, Agent, or Firm* — Workman Nydegger

(57) ABSTRACT

A method is provided for characterizing junction temperatures of power diodes devices, each of the diode devices being one-to-one connected in antiparallel to each power semiconductor switching devices of a voltage source inverter having processing and measuring capability, the method including: an initialization stage, wherein a heater is thermally coupled with a heatsink and/or with a direct bonded copper element of the voltage source inverter; a temperature setting stage, wherein the temperature of the direct bonded copper element and/or the heatsink is increased up to a maximum operative temperature; a commissioning stage, wherein at each current pulse of a current pulses train sampled data are collected in a sampling period wherein the corresponding power semiconductor switching device connected with at least one of the power semiconductor diode devices is turned-off; an output stage, wherein the processor generates, from the sampled data, processed data for at least one of the power semiconductor diode devices.

16 Claims, 5 Drawing Sheets

(56) References Cited

U.S. PATENT DOCUMENTS

2016/0356655 A1* 12/2016 Tsuramaru ............... G01K 7/42
2017/0327001 A1* 11/2017 Lu ......................... B60L 15/007
2019/0250046 A1    8/2019 Sun et al.
2019/0288596 A1    9/2019 Yasunaka et al.

OTHER PUBLICATIONS

Fausto Stella et al., *Three-Phase Inverter for Formula SAE Electric with Online Junction Temperature Estimation of all SiC MOSFETs*, 2020 IEEE Applied Power Electronics Conference and Exposition, Mar. 15, 2020, XP033784793, pp. 1154-1161.
International Search Report and Written Opinion dated Jul. 7, 2022, issued in PCT Application No. PCT/IB2021/053840, filed May 6, 2021.
Communication Pursuant to Article 94(3) EPC dated Apr. 1, 2025, issued in EP 21723418.6.

* cited by examiner

METHOD AND SYSTEM FOR CHARACTERIZING JUNCTION TEMPERATURES OF POWER DIODES OF A VOLTAGE SOURCE INVERTER

BACKGROUND OF THE INVENTION

1. The Field of the Invention

The present invention relates to a method and a system for characterizing junction temperatures of power diodes of a voltage source inverter (VSI), according to the preamble of claim 1. In particular, the present invention describes a method and system for characterization of junction temperature maps of the power diodes connected in antiparallel to power semiconductor switching devices, such as metal-oxide-semiconductor field-effect transistors (MOSFETs) or insulated-gate-bipolar transistors (IGBTs), used in a pulse-width-modulation (PWM) operated power converter and real-time estimate of junction temperatures using such maps during operation of the converter. As example, the present invention can be implemented for characterizing the temperature maps of power diodes during a preliminary session before the converter is installed into an industrial machinery or into an electric vehicle.

2. The Relevant Technology

The knowledge of the junction temperature of power semiconductors is essential for ensuring the safe operation of power converters. As example, in the United States patent application US2010/0327837 is described a power converter including an inverter circuit, comprising:
- a wide-bandgap semiconductor device which has a range in which the temperature coefficient of voltage drop during conduction is positive;
- a voltage measurement circuit that measures voltage drop between electrodes of the semiconductor device;
- a current measurement circuit that measures the output current of the inverter circuit.

The converter further includes a measurement condition setting circuit that adjusts the timing of the voltage measurement circuit and of the current measurement circuit, so that the measured values become data obtained at the same time. The temperature of the semiconductor device can be estimated by measuring the voltage drop and the current in the inverter using a temperature estimation circuit. The thermal characteristic of the junction of the semiconductor device can be retrieved, by the control circuit, by means of a program for computing the thermal characteristic of the junction or by means of a lookup table, stored in a memory unit of the converter. Using the thermal characteristic of the junction, the temperature estimation circuit can compute the temperature of a semiconductor device from a current command value of the inverter and a measurement value of the voltage measurement circuit. Then the operation of the inverter circuit is controlled within an appropriate temperature range so that the upper limit temperature of the device is not exceeded. However, the method in US2010/0327837 does not specify how to obtain such lookup table or program for computing the thermal characteristic of the junction.

Nowadays the knowledge of the semiconductor junction temperature of power diodes devices is still a challenge. Over the years the problem has become more important due to the further increased power density of the new devices such as Silicon Carbide (SiC) power MOSFETs. Several different approaches were proposed in the literature to characterize the temperature of power semiconductors devices: these approaches are divided into optical methods, physical contact methods and electrical methods.

The optical methods are based on the detection of optical proprieties of the semiconductor, which are temperature dependent. The thermal image of the semiconductor die (synonym of junction in this respect), is acquired through an infrared camera which has visual access to the chip. The optical methods can achieve a high level of accuracy and provide a thermal map of the semiconductor die, from which the points of maximum temperature and the gradient of temperature across the die are easily determined. However, these methods require special laboratory equipment and non-reversible modification of the power device, and therefore are not viable solutions for commercial applications. The physical contact methods put thermo-sensitive devices, such as thermocouples or thermistors, thermally coupled with the direct-bonded-copper (DBC) substrate or of the heatsink, which are both thermally coupled with the semiconductor junctions of the power diode devices of a converter. The converter is designed for the worst-case operating conditions plus a margin based on experience and off-line thermal modelling. During the operative stage of the converter, it is a common practice to limit the converter output current at low frequency with respect to nominal AC frequency conditions, as low frequency currents heat the converter more than high frequency currents. The temperature model is based on the converter's parameters and operating conditions such as thermal model of the component and the cooling system of the converter and the loss model of the components. These data are available in the component datasheets, for a limited number of operating conditions. If well calibrated, the error in temperature estimate is in the order of 20-50° C. As mentioned before, such uncertainty turns into a safety margin at design level of the converter. In more sophisticated applications, the thermo-sensitive devices are in direct contact with the die of the power semiconductor diode devices. This approach requires mechanical access to the die inside the power semiconductor diode devices and has a limited accuracy and dynamic response.

The electrical methods are based on the detection of thermo-sensitive electrical parameters (TSEPs). The most significant techniques in this field are based on the evaluation of a thermal-electrical model of the power semiconductor switching devices.

Recently a TSEP technique has been proposed for example by F. Stella, G. Pellegrino, E. Armando and D. Daprà, in the article "Online Junction Temperature Estimation of SiC Power MOSFETs Through ON-State Voltage Mapping", published in IEEE Transactions on Industry Applications, vol. 54, no. 4, pp. 3453-3462, in July-August 2018. The authors above have introduced a characterization method of the junction temperature of a SiC power MOSFET device embedded in a 4-switch module converter. The junction temperature model of the power MOSFET is built via the initial commissioning of the ON-state voltage ($V_{ON}$) of the monitored power switch. The junction temperature characterization of the power MOSFET is represented by a look-up-table stored into a memory unit of the converter, defining the ON-state voltage ($V_{ON}$) as a function of the junction temperature and the conducted current. The look-up table is then used for the junction temperature estimation during the operating stage of the converter.

The technical solution described in the above-mentioned article has the following drawbacks.

A first drawback of such method is that it aims to characterize the junction temperature of a single power semiconductor switching device, such as a MOSFET device embedded in a 4-switch module converter. That method does not teach how to characterize the junction temperature of a power diode eventually connected in antiparallel to the MOSFET. In order to achieve a satisfying performance of a voltage source inverter, the knowledge of the junction temperature model of a single power semiconductor switching device, such as a power MOSFET device, is not enough.

A further drawback of such method is that it does not provide any technique for characterizing junction temperatures involving a plurality of power semiconductor diodes devices, such as these that can be included into a voltage source inverter (VSI).

SUMMARY OF THE INVENTION

The present invention aims at solving these and other problems by providing an improved method and a system for characterizing junction temperatures of power diodes of a voltage source inverter such that their commissioning can be performed directly on the inverter in its final form, such as for example during end-of-line tests.

In this way, the proposed invention can characterize the junction temperatures of a plurality of power diodes of a voltage source inverter, in order to achieve an effective characterization of their junction temperatures, such that the voltage source inverter can improve its efficiency during its operative conditions. Furthermore, the framework here disclosed can be easily embedded for example into an industrial machinery or into an electric vehicle.

BRIEF DESCRIPTION OF THE DRAWINGS

The invention will be described in detail hereinafter through non-limiting embodiments with reference to the attached figures, in which.

DETAILED DESCRIPTION OF THE PREFERRED EMBODIMENTS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
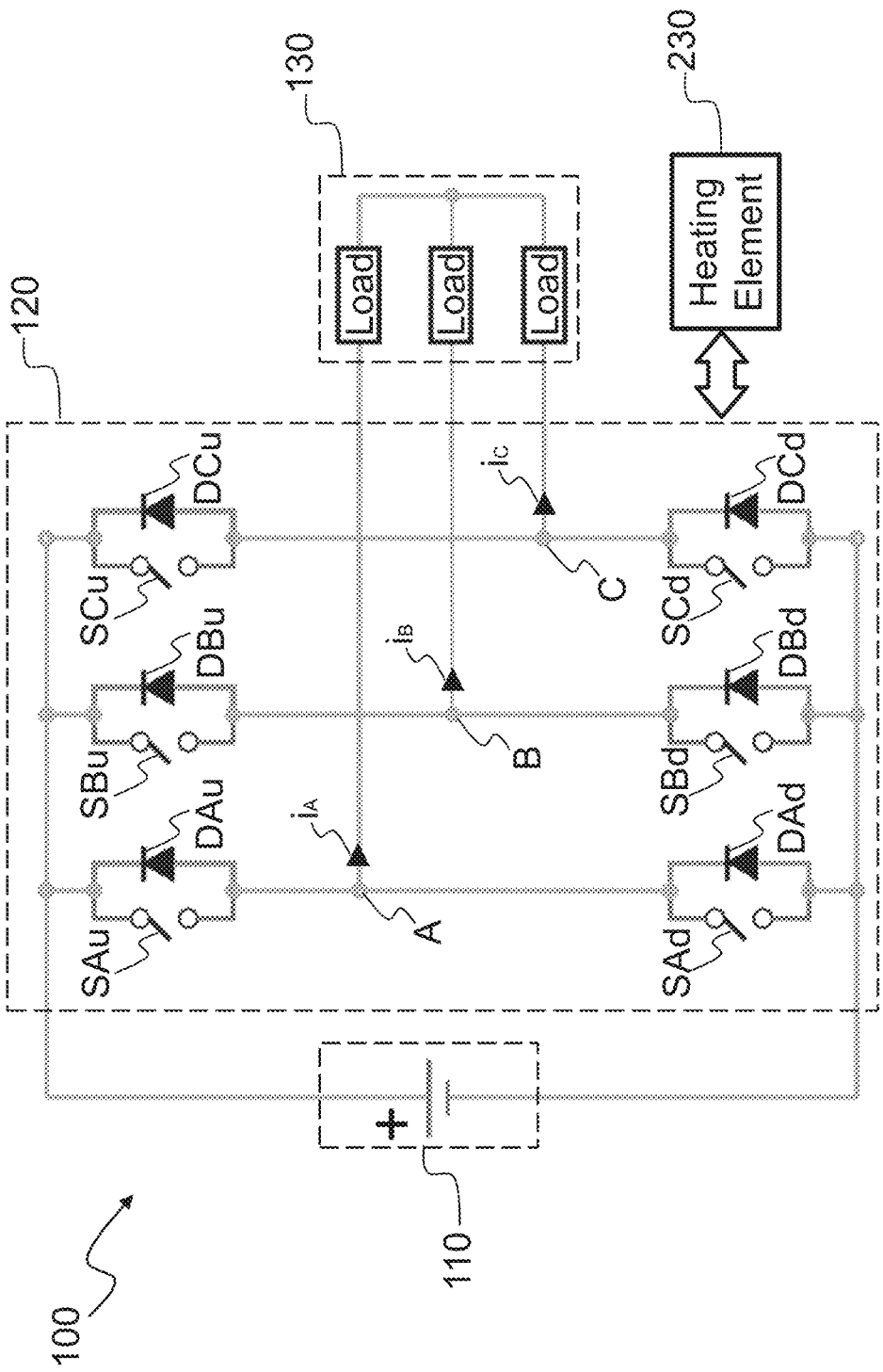
FIG. 1 schematically represents a diagram illustrating a system for characterizing junction temperatures of power diodes of a voltage source inverter, according to an embodiment of the present invention.

With reference to FIG. 1, a system 100 for characterizing junction temperatures of power semiconductor diode devices DAu, DAd, DBu, DBd, DCu, DCd of a voltage source inverter 120, such as for example a three-phase voltage source inverter, is shown. The system 100 comprises power supply means 110, load means 130 and heating means 230, which are operatively connected to each other.

The power supply means 110 are adapted to supply electric power to the voltage source inverter 120, by means of a direct supplied voltage $V_{DC}$. In an embodiment of the present invention, the power supply means 110 can comprise one or more electric batteries or electric accumulators, such as for example a lithium-ion battery. In another embodiment of the present invention, the power supply means 110 can comprise a rectifier circuit that converts alternating current (AC), for example from an electric power provider, to a direct current (DC).

In a preferred embodiment of the present invention, the voltage source inverter 120 is adapted to provide a three-phase power supply to the load means 130 by generating electric modulated currents and voltages. As shown in FIG. 1, the voltage source inverter 120 comprises six power semiconductor switching devices SAu, SAd, SBu, SBd, SCu, SCd arranged in three half-bridges, also known as three inverter legs, each including two power semiconductor switching devices. The voltage source inverter 120 comprises six power semiconductor diode devices DAu, DAd, DBu, DBd, DCu, DCd which are one-to-one connected in antiparallel to each power semiconductor switching devices SAu, SAd, SBu, SBd, SCu, SCd, respectively. Said power semiconductor diode devices DAu, DAd, DBu, DBd, DCu, DCd are useful given the usually inductive nature of the load means 130 in order to allow a return of reactive energy from the load means 130 to the power supply means 110. Each leg defines a first phase A, a second phase B and a third phase C, which are electrically connected to the load means 130. According to the well-known pulse width modulation (PWM) technique, the desired magnitude and frequency of a generated output voltage can be obtained by controlling the switching action of said power semiconductor switching devices SAu, SAd, SBu, SBd, SCu, SCd so that: when averaged in time, a controlled three-phase voltage is generated. According to the PWM technique principles, each phase is PWM modulated over the same PWM period. For example, considering 20 kHz PWM modulation, the corresponding PWM period is 50 μs for each phase. The power semiconductor switching devices SAu, SAd, SBu, SBd, SCu, SCd can assume eight possible switching states defining two null-state phasors and six active-state phasors which can be represented, in a complex plane, by a hexagon representing a range of realizable voltage space phasors which can be partitioned up into six sectors. The length of each active-state phasor is a fraction of the direct supplied voltage $V_{DC}$, while the length of each null-state phasor is zero. In a sampling interval, the generated output voltage phasor can be obtained by having various turn-on times of the eight switching states. It should be noted that for each leg only one of said power semiconductor switching devices SAu, SAd, SBu, SBd, SCu, SCd can be turned ON at a time; they cannot be switched ON simultaneously because this would result in a short circuit. The eight switching states are summarized in the following Table 1, where "0" indicates that one of upper power semiconductor switching devices SAu, SBu, SCu is OFF, whereas "1" indicates that one of the upper power semiconductor switching devices SAu, SBu, SCu is ON.

TABLE 1

| Switching state [SAu, SBu, SCu] | Phasor Type | Phasor Definition |
|---|---|---|
| 000 | null-state | 0 |
| 100 | active-state | $(2\,V_{DC}/3)$ |
| 110 | active-state | $(2\,V_{DC}/3)\,e^{i2\pi/3}$ |
| 010 | active-state | $(2\,V_{DC}/3)\,e^{i2\pi/3}$ |
| 011 | active-state | $-(2\,V_{DC}/3)$ |
| 001 | active-state | $(2\,V_{DC}/3)\,e^{i4\pi/3}$ |
| 101 | active-state | $(2\,V_{DC}/3)\,e^{i5\pi/3}$ |
| 111 | null-state | 0 |

In another embodiment of the present invention, the voltage source inverter 120 can be as example an half-bridge inverter comprising two power semiconductor switching devices and two power semiconductor diode devices one-to-one connected in antiparallel to each power semiconductor switching devices, or can be a full-bridge inverter comprising four power semiconductor switching devices and four power semiconductor diode devices one-to-one connected in antiparallel to each power semiconductor switching devices.

The load means 130 are adapted to absorb the electric power, needed to perform a work, provided by voltage source inverter 120. In an embodiment of the present invention, the load means 130 can comprise an inductive load such as for example a three-phase electric motor which can be equipped into an industrial machinery or into a transportation system such as an electric vehicle, an airborne actuator or generator, an elevator, a passenger conveyor and the like, or it can be connected to the three-phase AC grid, as it is the case of an active front end rectifier, an active filter or the like. The load means 130 can be operatively connected with mechanical elements of said industrial machinery or said transportation system in order to perform said work.

The heating means 230 are adapted to heat the junctions of the power semiconductor diode devices DAu, DAd, DBu, DBd, DCu, DCd at a maximum operative temperature, which is higher than the temperature of the environment in which the voltage source inverter 120 operates. The heating means 230 can comprise heating elements, such as electric resistors, thermally coupled with the heatsink and/or with the direct bonded copper (DBC) element which are both thermally coupled with the semiconductor junctions of the power semiconductor diode devices DAu, DAd, DBu, DBd, DCu, DCd of the voltage source inverter 120. The heating means 230 can be thermally coupled or decoupled manually or automatically to said heatsink and/or DBC element, for example by means of actuator means. The heating means 230 can be powered by said power supply means 110 or by an external power source.

Figure 2:
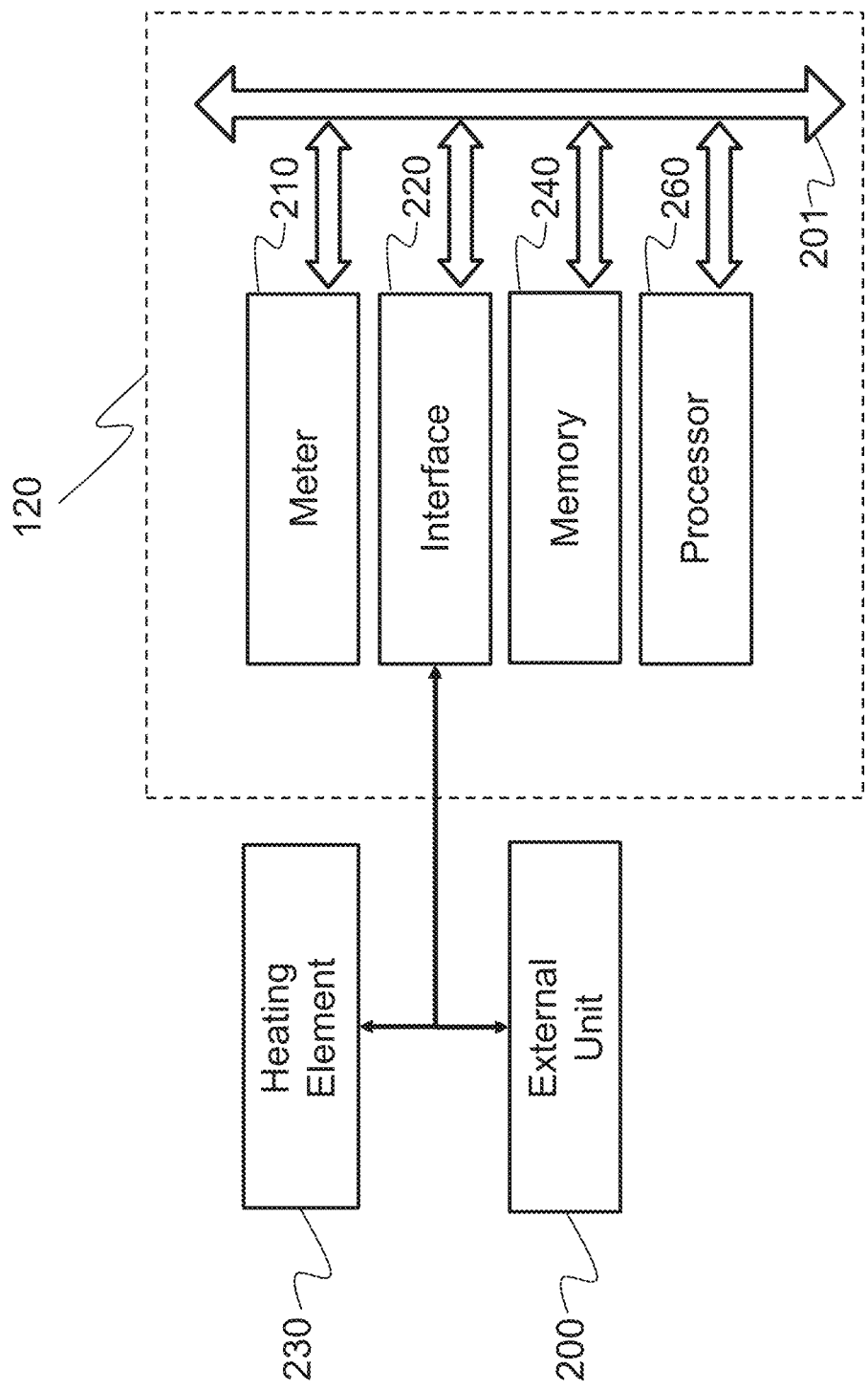
FIG. 2 schematically represents a block diagram illustrating the inverter and the system of FIG. 1.

FIG. 2 illustrates a block diagram exemplifying the voltage source inverter 120 and the system 100 adapted to perform the method according to an embodiment of the present invention, which will be described in detail with reference to FIG. 3. The voltage source inverter 120 comprises processing means 260, memory means 240, interface means 220 and measuring means 210 which can be operatively connected, as example, through a communication bus 201 which allows to exchange information among them.

The measuring means 210 are adapted to measure the voltage drop between the power electrodes of said power semiconductor diode devices DAu, DAd, DBu, DBd, DCu, DCd. As example, said voltage drop between the power electrodes corresponds to the voltage drop measured between the anode-electrode and the cathode-electrode of each diode device. The measuring means 210 are also adapted to measure the output current of each phase. As example, considering FIG. 1, a first output current $i_A$, a second output current $i_B$ and a third output current $i_C$, corresponding respectively to the first phase A, the second phase B and the third phase C, can be measured. Said inverter measuring means can be implemented by one or more electric circuits known in the art suitable for measuring electric voltage values and/or electric current values. The measuring means 210 are also adapted to measure the temperature values of the heatsink and/or the direct bonded copper DBC element of the voltage source inverter 120. The measuring means 210 can comprise thermic sensors, such as for example negative temperature coefficient (NTC) thermistors and/or positive temperature coefficient (PTC) thermistors, adapted to be thermally coupled to said heatsink and/or DBC element.

The memory means 240 are adapted to store information and the set of instructions for carrying out the method according to an embodiment of the present invention. As example, the memory means 240 can be adapted to store information and a set of instructions for controlling the switching action of said power semiconductor switching devices SAu, SAd, SBu, SBd, SCu, SCd according to an embodiment of the present invention. The method of the present invention will be described in detail with reference to FIG. 3. The stored information can be related to sampled data, such as temperature values, electric voltage values and/or electric current values measured by said measuring means 210 and output information, such as processed data, of method for characterizing junction temperatures of semiconductor diode devices, according to the present invention. This output information can be stored, for each power semiconductor switching device, as a lookup-table relating the temperature values of the junction with the corresponding electric voltage and electric current values. Such memory means 240 can comprise for example volatile and/or non-volatile memory units based on semiconductor-electronic and/or opto-electronic and/or magnetic technologies.

The interface means 220 are adapted to exchange management information between the voltage source inverter 120 and said heating means 230. In further embodiment of the present invention, the interface means 220 are also adapted to exchange management information between the voltage source inverter 120 and an external unit 200 adapted to read data, such as instructions, from a user and/or adapted to provide data to said user. The management information can be related to the parameters, instructions, commands, sampled data, processed data that can be exchanged between the heating means 230 and/or the external unit 200 and the voltage source inverter 120. As example, the management information can comprise the lookup-tables relating the temperature values of the junctions, the measured electric voltage, the electric current values and/or to the set of instructions for carrying out the method described by the present invention, such as the set of instruction for controlling said measuring means 210 and so on so forth. The interface means 220 can comprise for example a transceiver according to SPI, USART, RS232, JTAG, Ethernet, CAN-BUS standards or the like. Moreover, the external unit 200 can be implemented, as example, by a personal computer equipped with electronic cards for communicating with the interface means 220 and/or the heating means 230.

The processing means 260 are adapted to process the data and to execute the set of instructions stored by the memory means 240. Such inverter processing means can comprise for example a Central Processing Unit (CPU) which can be implemented by purpose-built chipsets or by FPGSA boards. The processing means 260 can control the operations performed by the measuring means 210, the interface means 220, the heating means 230 and the memory means 240. The processing means 260 can carry out one or more operations of the method described by the present invention, such as for example the switching action of said power semiconductor switching devices SAu, SAd, SBu, SBd, SCu, SCd according to the present invention.

Besides, the block diagram shown in FIG. 2 is of exemplificative nature only; it allows to understand how the invention works and how it can be realized by the person skilled in the art. The person skilled in the art understands that these charts have no limitative meaning in the sense that functions, interrelations and information shown therein can be arranged in many equivalents ways; for example, operations appearing to be performed by different logical blocks can be performed by any combination of hardware and software resources, being also the same resources for realizing different or all blocks.

Figure 3:
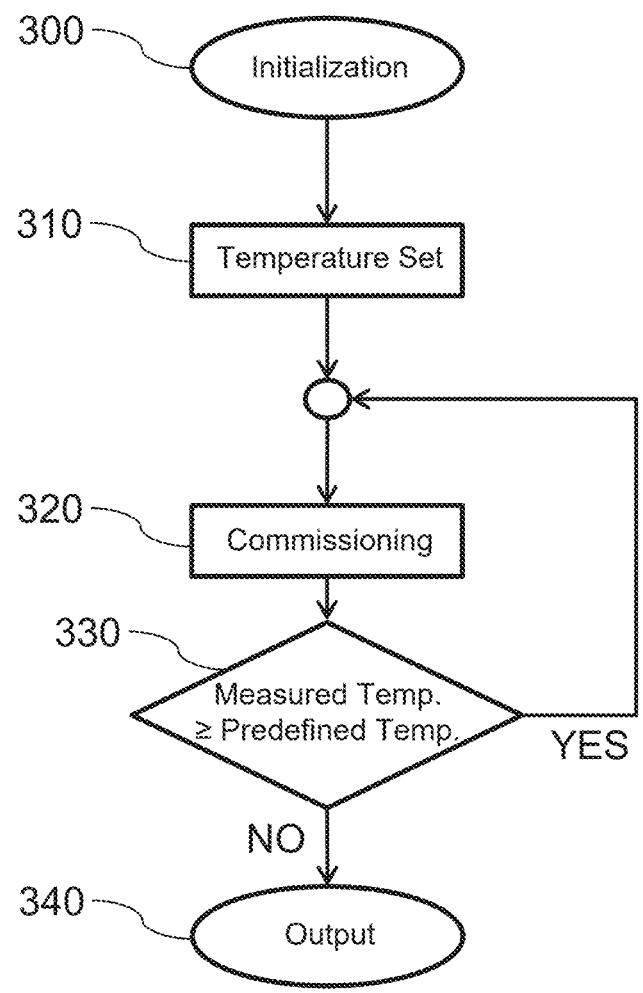
FIG. 3 shows a flow chart exemplifying a method for characterizing junction temperatures of power diodes of the inverter shown in FIG. 1.

With reference to FIG. 3, a method for characterizing junction temperatures of power diodes, namely the power semiconductor diode devices DAu, DAd, DBu, DBd, DCu, DCd of a voltage source inverter 120 is described.

At step 300 an initialization stage is performed by said processing means 260. During this stage, the processing means 260 fetch said input information and/or said management information which can be already stored by the memory means 240 or can be retrieved by said interface means 220, and then stored by the memory means 240. The input information can comprise at least a portion of said management information that can be exchanged between the external unit 200 and the voltage source inverter 120 by means of said interface means 220. During this stage, the heating elements can be first thermally coupled to said heatsink and/or DBC element, for example by means of first pliers, included into the heating elements, which can be activated by said actuator means.

At step 310 a temperature setting stage is performed by said processing means 260. During this stage, the processing means 260 control the heating means 230 such that the temperature of the DBC and/or the heatsink, and thus the junction temperatures of said power semiconductor diode devices DAu, DAd, DBu, DBd, DCu, DCd, is increased up to the maximum operative temperature. The heating elements can be activated until the temperature of the DBC and/or the heatsink, and therefore the junction temperatures of said power semiconductor diode devices DAu, DAd, DBu, DBd, DCu, DCd, increase up to said maximum operative temperature, such as for example 150° C. Successively, the heating elements can be deactivated and/or thermally decoupled, for example, by means of the first pliers which can be deactivated by the actuator means.

At step 320 a commissioning stage is performed by said processing means 260. During this stage, the processing means 260 command a current pulses train in at least a phase of the voltage source inverter 120 and at each current pulse 422 of the current pulses train the processing means 260 collect, by means of said measuring means 210, sampled data comprising junction temperature values, current values and voltage values for at least one of said power semiconductor diode devices DAu, DAd, DBu, DBd, DCu, DCd.

According to a preferred embodiment of the present invention, the processing means 260 can command a current pulses train for each of said phase of the voltage source inverter 120 according to a predefined phasors sequence. As example, in the case the voltage source inverter 120 is a three-phase inverter, the processing means 260 can command a current pulses train for each of said first phase A, second phase B and third phase C according to the predefined phasors sequence is defined by the sequence {"100", "110", "010", "011", "001", "101"} of the active-state phasors. This stage is performed during the PWM modulation according to a PWM duty-cycle over said PWM period for each of said first phase A, second phase B and third phase C. This sequence {"100", "110", "010", "011", "001", "101"} of the active-state phasors advantageously allows to safely perform the PWM modulation without any damage of the voltage source inverter 120.

Figure 4:
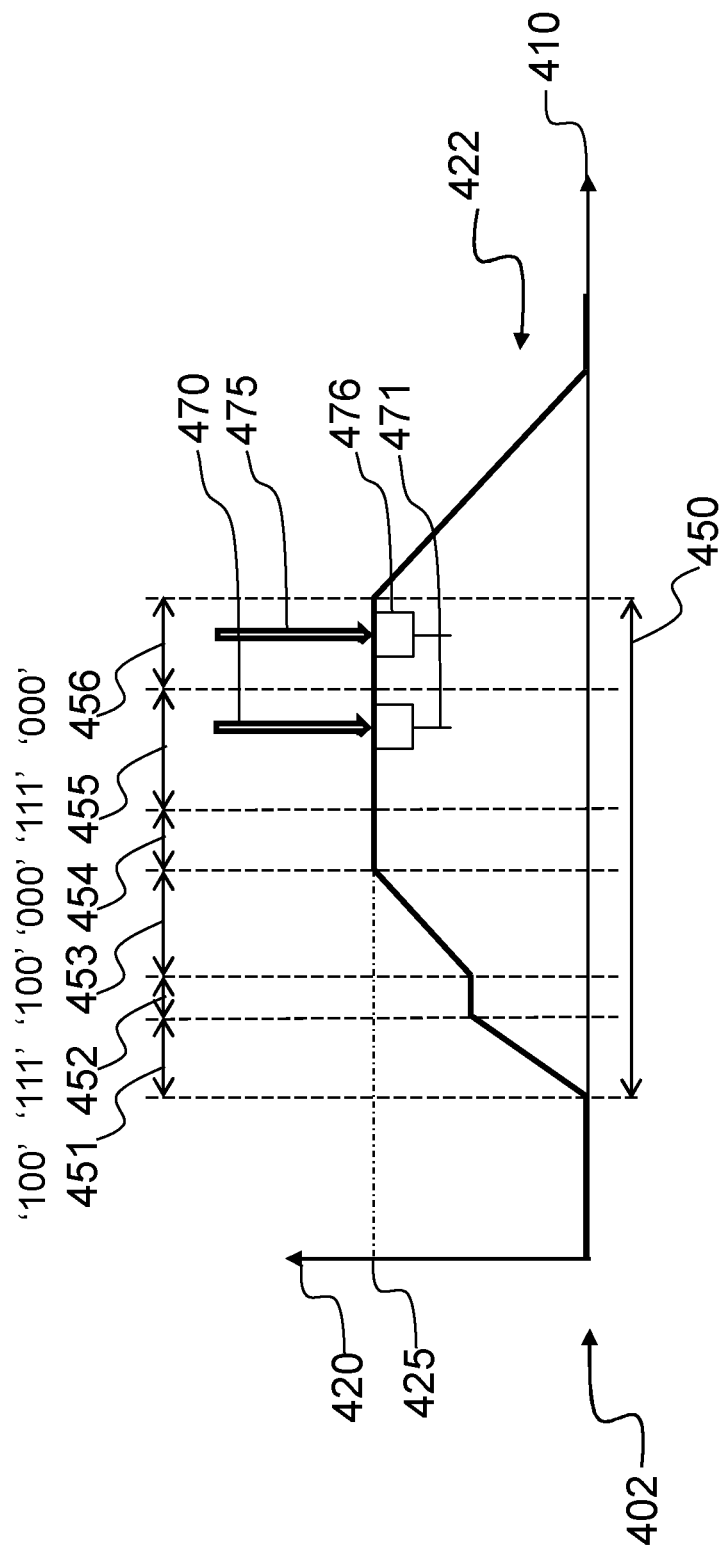
FIG. 4 schematically represents a current pulse involved in the method shown in FIG. 3.

FIG. 4 schematically represents a current diagram 402 of the current pulse 422, of said current pulses train, referred to a phase of the voltage source inverter 120, such as for example said first phase A. The current diagram 402 comprises a current axis 420 and a time axis 410 for which a set of switching time intervals 451, 452, 453, 454, 455, 456 are shown. The current pulse 422 is controlled by alternating the active-state phasor of the predefined phasors sequence, such as "100" for this example, and the two null-state phasors "111" and "000" shown in Table 1. For example, according to FIG. 4, for the switching time intervals 451, 452, 453, 454, 455, 456 correspond the following switching states "100", "111", "100", "000", "111", "000", respectively.

The current pulses train comprises a predefined number of current pulses 422, for example twenty-four current pulses 422, such that a current amplitude 425 of each current pulse 422, of said current pulses train, increases of a predefined current amplitude increment from a lower current value to a maximum current value. As example, the lower current value can be 10 A while the maximum current value can be 240 A, therefore, the current amplitude 425 of a first current pulse of said current pulses train can be 10 A while the current amplitude 425 of a last current pulse of said current pulses train can be 240 A. The current amplitude increment can be the same amount for each current pulse, i.e. for example 10 A, or can be different according to a predefined incrementing rule.

Each current pulse 422, of said current pulses train, has a current pulse duration 450 which is substantially up to two PWM periods, while an idle interval between two adjacent current pulses 422 is up to two-thousand times of said current pulse duration 450. As example, in the case of 20 kHz PWM modulation, the corresponding PWM period is 50 µs, thus the current pulse duration 450 can be 100 µs while the idle interval between two adjacent current pulse can be up to 200 ms. This allows advantageously to guarantee that the junction temperatures of the power semiconductor diode devices DAu, DAd, DBu, DBd, DCu, DCd have no time to change during this stage respect to the DBC and the heatsink temperatures, that are measurable.

At each current pulse 422, said sampled data are collected in a sampling period wherein the corresponding power semiconductor switching device SAu, SAd, SBu, SBd, SCu, SCd connected with of one of said power semiconductor diode devices DAu, DAd, DBu, DBd, DCu, DCd is turned-off by means of the processing means 260. In this way, the sampled data can advantageously comprise junction temperature values, current values and voltage values of at least one of said power semiconductor diode device DAu, DAd, DBu, DBd, DCu, DCd. Said sampling period has a duration which is substantially up to one twenty-fifth of the PWM period. As example, in the case of 20 kHz PWM modulation, the corresponding PWM period is 50 µs, thus the duration of the sampling period can be up to 2 µs.

Figure 5:
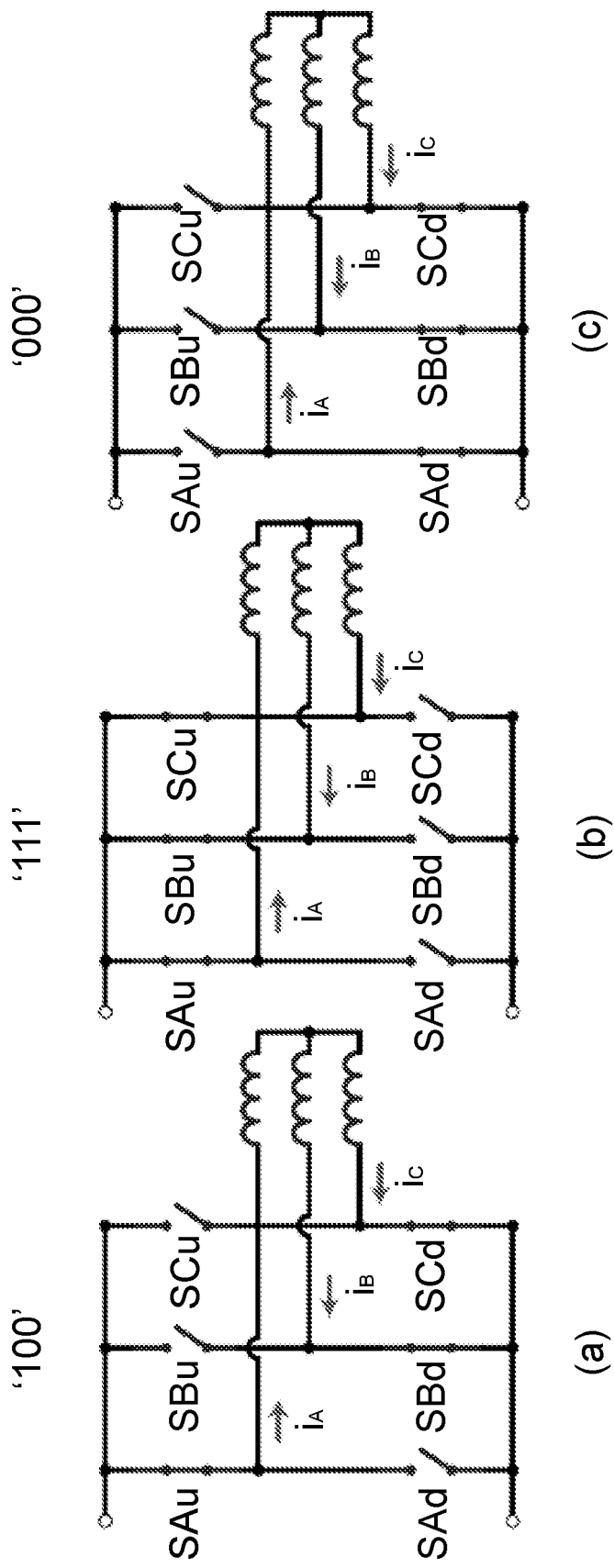
FIG. 5 schematically represents some power switch configurations involved in the method shown in FIG. 3.

According to a preferred embodiment of the present invention a first sampled data 470 are collected in occasion of a first sampling period 471 and a second sampled data 475 are collected in occasion a second period 476. With reference to FIG. 5, having considered the phase A, aligned to the active-state phasor "100" for this example, a positive voltage is applied on the first phase A of the voltage source inverter 120, and therefore the current pulse 422 is applied on the first phase A and is controlled by alternating the active-state phasor "100" and the two null-state phasors "111" and "000" (see FIG. 4). When the active-state phasor "100" occurs (see FIG. 5a), the first output current $i_A$ flows through first phase A and returns via second phase B and the third phase C through the power semiconductor switching devices. In this case, the first output current $i_A$ flows through the power semiconductor switching device SAu, while the second output current $i_B = i_A/2$ and a third output current $i_C = i_A/2$ flow through the power semiconductor switching devices SBd and SCd, respectively.

When the null-state phasor "111" occurs (see FIG. 5b), the first output current $i_A$ flows through the power semiconductor switching device SAu, while the second output current $i_B = -i_A/2$ and a third output current $i_C = -i_A/2$ flow through the power semiconductor switching devices SBu and SCu, respectively. In this case, the first sampled data 470 are collected in occasion of the first sampling period 471, for example having duration of 1.5 μs, where both the power semiconductor switching devices SBu and SCu, having negative current, are turned-off by means of the processing means 260. Therefore, during the first sampling period 471, only the junction temperature values, current values and voltage values of the corresponding power semiconductor diode devices DBu and DCu, which are connected respectively with the power semiconductor switching devices SBu and SCu, are collected.

When the null-state phasor "000" occurs (see FIG. 5c), the first output current $-i_A$ flows through the power semiconductor switching device SAd, while the second output current $i_B = i_A/2$ and a third output current $i_C = i_A/2$ flow through the power semiconductor switching devices SBd and SCd, respectively. In this case, the second sampled data 475 are collected in occasion of the second sampling period 476, for example having duration of 1.5 μs, where the power semiconductor switching device SAd, having negative current, is turned-off by means of the processing means 260. Therefore, during the second sampling period 476, only the junction temperature values, current values and voltage values of the corresponding power semiconductor diode device DAd, which is connected with the power semiconductor switching devices SAd, are collected.

Referring to FIG. 4, the first sampling period 471 occurs during the switching time 455 corresponding to the null-state phasor "111" and the second sampling period 476 occurs during the successive switching time 456 corresponding to the null-state phasor "000" such that the null-state phasor "111" and the null-state phasor "000" are adjacent in time.

The same operations are performed for each active-state phasors of said predefined phasors sequence {"100", "110", "010", "011", "001", "101"}, obtaining the following Table 2 which summarize the measurements performed during this stage, where electric currents flowing from the cathode to the anode of each diode are considered positive.

TABLE 2

| Switching state of the active-state phasors [SAu, SBu, SCu] | 1$^{st}$ sampled data; sampled Currents | 2$^{nd}$ sampled data; sampled Currents |
| --- | --- | --- |
| 100 | (DBu; $-i_A/2$) (DCu; $-i_A/2$) | DAd; $-i_A$ |
| 110 | DCu; $-i_C$ | (DAd; $-i_C/2$) (DBd; $-i_C/2$) |
| 010 | (DAu; $-i_B/2$) (DCu; $-i_B/2$) | DBd; $-i_B$ |
| 011 | DAu; $-i_A$ | (DBd; $-i_A/2$) (DCd; $-i_A/2$) |
| 001 | (DAu; $-i_C/2$) (DBu; $-i_C/2$) | DCd; $-i_C$ |
| 101 | DBu; $-i_B$ | (DAd; $-i_B/2$) (DCd; $-i_B/2$) |

The first and the second sampled data, shown in Table 2, are collected in a total sampling time such that the junction temperatures of the power semiconductor switching diodes DAu, DAd, DBu, DBd, DCu, DCd have no time to change. As example, considering the current pulses train having twenty-four pulses with 200 ms of the idle interval for each of the six active-state phasors of said predefined phasors sequence {"100", "110", "010", "011", "001", "101"}, the total sampling time is thus about 30 s which is usually shorter than the time required by the heatsink and/or with the direct bonded copper (DBC) element, thermally coupled with the semiconductor junctions of the power semiconductor diode devices DAu, DAd, DBu, DBd, DCu, DCd, for changing their temperatures.

When all the first and the second sampled data, shown for example in Table 2, have been collected, the processing means 260 save these data in the memory means 240.

At step 330 a check phase is performed by said processing means 260. During this phase, the processing means 260 wait until the temperature values measured by said thermic sensors naturally drop of a predefined temperature step value, such as for example 5° C.; usually the waiting time can be for example of about a couple of minutes. The processing means 260 evaluate if the temperatures measured by said thermic sensors are greater or equal to a predefined lower temperature value, such as for example 25° C. In the affirmative case, the processing means 260 execute step 320, otherwise they execute step 340.

At step 340 an output phase is performed by said processing means 260. During this phase, the processing means 260 generate processed data from said sampled data. The processed data can comprise, for at least one of said power semiconductor diode device, the junction temperature values and the corresponding electric voltage and electric current values. The processed data can be organized as lookup-table data which can be represented for example in a 3D-plot. During this phase, said output information can be saved in the memory means 240 and/or can be sent from the voltage source inverter 120 to the external unit 200 by means of said interface means 220. Next, the processing means 260 can thermally decouple, if necessary, the heating elements, for example by means of the first pliers which can be deactivated by the actuator means.

The method of the present invention can be easily implemented as example for characterizing junction temperatures of power diodes of a half-bridge inverter or can be employed for characterizing junction temperatures of power diodes of a full-bridge inverter.

In another embodiment of the present invention, the system 100 and the method of the present invention can be embedded into an industrial machinery or into an electric vehicle. The advantages of the present invention are therefore evident from the description provided above.

The method and a system for characterizing junction temperatures of power diodes of a voltage source inverter, according to the present invention, advantageously allow to characterize the junction temperatures involving of at least a one power diode. In this way it is possible to control the switching actions of the power semiconductor switching devices safely and adaptively.

A further benefit of the present invention is that it allows to characterize the junction temperatures of a plurality of power semiconductor diode devices directly on the converter, that is with the power devices in their final layout and using the sensors on board of the converter and without using laboratory instrumentation. This advantageously allows to take into account unknown electric quantities such as parasitic electric resistance, inductance and capacitance, involved during the characterization of a plurality of power semiconductor diode devices. Thanks to the present invention, a higher precision of the junction temperatures estimation, about 5° C. against 20° C., and a faster dynamic response, about 100 µs against 10 ms, have been proved by the Applicant.

Another benefit of the present invention is that increasing both accuracy and dynamic response allows to improve the exploitation of the power semiconductors, and therefore more peak power from the same inverter device can be employed. Such peak power can be adapted to the current thermal state of the inverter devices.

A further benefit of the present invention is that it allows to characterize the junction temperatures at different times during the operative period of the power semiconductors, providing information about the health of the semiconductor.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for characterizing junction temperatures of power semiconductor diode devices (DAu, DAd, DBu, DBd, DCu, DCd), each of said power semiconductor diode devices being one-to-one connected in antiparallel to each power semiconductor switching devices (SAu, SAd, SBu, SBd, SCu, SCd) of a voltage source inverter comprising processing means and measuring means, said method comprising:
an initialization stage, wherein heating means are thermally coupled with a heatsink and/or with a direct bonded copper element of the voltage source inverter;
a temperature setting stage, wherein the processing means control the heating means such that the temperature of said direct bonded copper element and/or said heatsink is increased up to a maximum operative temperature;
a commissioning stage, wherein said processing means command a current pulses train in at least a phase of the voltage source inverter and at each current pulse of said current pulses train the processing means collect, by means of said measuring means, sampled data comprising junction temperature values, current values and voltage values of at least one of said power semiconductor diode devices (DAu, DAd, DBu, DBd, DCu, DCd),
said sampled data are collected in a sampling period wherein the corresponding power semiconductor switching device (SAu, SAd, SBu, SBd, SCu, SCd) connected with at least one of said power semiconductor diode devices (DAu, DAd, DBu, DBd, DCu, DCd) is turned-off by means of the processing means;
an output stage, wherein said processing means generate, from said sampled data, processed data comprising for at least one of said power semiconductor diode devices (DAu, DAd, DBu, DBd, DCu, DCd) the junction temperature values and the corresponding electric voltage and electric current values.

2. The method according to claim 1, wherein said sampling period has a duration which is substantially up to one twenty-fifth of a PWM periods of a PWM modulation of the voltage source inverter.

3. The method according to claim 1, wherein said processing means command the current pulses train for each of said phase of the voltage source inverter according to a predefined phasors sequence.

4. The method according to claim 1, wherein the current pulses train comprises a predefined number of current pulses so that a current amplitude, of each current pulse, increases of a predefined current amplitude increment from a lower current value to a maximum current value.

5. The method according to claim 1, wherein each current pulse has a current pulse duration which is substantially up to two PWM periods of a PWM modulation of the voltage source inverter, and wherein an idle interval between two adjacent current pulses is up to two-thousand times of said current pulse duration.

6. The method according to claim 1, wherein said processed data are organized as lookup-table data.

7. The method according to claim 1, wherein said processed data are saved in memory means of the voltage source inverter and/or are sent from the voltage source inverter to an external unit by means of interface means of the voltage source inverter.

8. A system for characterizing junction temperatures of power semiconductor diode devices (DAu, DAd, DBu, DBd, DCu, DCd) each of said power semiconductor diode devices being one-to-one connected in antiparallel to each power semiconductor switching devices (SAu, SAd, SBu, SBd, SCu, SCd) of a voltage source inverter comprising processing means and measuring means, said system further comprising heating means being operatively connected with said voltage source inverter,
said heating means being adapted to be thermally coupled with a heatsink and/or with a direct bonded copper element of the voltage source inverter,
said processing means being adapted to control the heating means such that the temperature of said direct bonded copper element and/or said heatsink is increased up to a maximum operative temperature,
the processing means being adapted to command a current pulses train in at least a phase of the voltage source inverter, wherein at each current pulse of said current pulses train the processing means are adapted to collect, by means of said measuring means, sampled data comprising junction temperature values, current values, voltage values of at least one of said power semiconductor diode devices (DAu, DAd, DBu, DBd, DCu, DCd), said sampled data being collected in a sampling period wherein the corresponding power semiconductor switching device (SAu, SAd, SBu, SBd, SCu, SCd) connected with at least one of said power semiconductor diode devices (DAu, DAd, DBu, DBd, DCu, DCd) is turned-off by means of the processing means, and wherein said processing means are adapted to generate, from said sampled data, processed data comprising for at least one of said power semiconductor diode devices (DAu, DAd, DBu, DBd, DCu, DCd) the junction temperature values and the corresponding electric voltage and electric current values.

9. The system according to claim 8, wherein said sampling period is adapted to have a duration which is substantially up to one twenty-fifth of a PWM periods of a PWM modulation of the voltage source inverter.

10. The system according to claim 8, wherein said processing means are adapted to command the current pulses train for each of said phase of the voltage source inverter according to a predefined phasors sequence.

11. The system according to claim 8, wherein the current pulses train comprises a predefined number of current pulses such that a current amplitude, of each current pulse, increases of a predefined current amplitude increment from a lower current value to a maximum current value.

12. The system according to claim 8, wherein each current pulse has a current pulse duration which is substantially up to two PWM periods of a PWM modulation of the voltage source inverter, and wherein an idle interval between two adjacent current pulses is up to two-thousand times of said current pulse duration.

13. The system according to claim 8, wherein said processed data are organized as lookup-table data.

14. The system according to claim 8, wherein said processed data are saved in memory means of the voltage source inverter and/or are sent from the voltage source inverter to an external unit by means of interface means of the voltage source inverter.

15. A method for characterizing junction temperatures of power semiconductor diode devices (DAu, DAd, DBu, DBd, DCu, DCd), each of said power semiconductor diode devices being one-to-one connected in antiparallel to each power semiconductor switching devices (SAu, SAd, SBu, SBd, SCu, SCd) of a voltage source inverter comprising a processor and a meter, said method comprising:

an initialization stage, wherein a heater is thermally coupled with a heatsink and/or with a direct bonded copper element of the voltage source inverter;

a temperature setting stage, wherein the processor controls the heater such that the temperature of said direct bonded copper element and/or said heatsink is increased up to a maximum operative temperature;

a commissioning stage, wherein said processor commands a current pulses train in at least a phase of the voltage source inverter and at each current pulse of said current pulses train the processor collects, by said meter, sampled data comprising junction temperature values, current values and voltage values of at least one of said power semiconductor diode devices (DAu, DAd, DBu, DBd, DCu, DCd), said sampled data are collected in a sampling period wherein the corresponding power semiconductor switching device (SAu, SAd, SBu, SBd, SCu, SCd) connected with at least one of said power semiconductor diode devices (DAu, DAd, DBu, DBd, DCu, DCd) is turned-off by the processor;

an output stage, wherein said processor generates, from said sampled data, processed data comprising for at least one of said power semiconductor diode devices (DAu, DAd, DBu, DBd, DCu, DCd) the junction temperature values and the corresponding electric voltage and electric current values.

16. A system for characterizing junction temperatures of power semiconductor diode devices (DAu, DAd, DBu, DBd, DCu, DCd) each of said power semiconductor diode devices being one-to-one connected in antiparallel to each power semiconductor switching devices (SAu, SAd, SBu, SBd, SCu, SCd) of a voltage source inverter comprising a processor and a meter, said system further comprising a heater being operatively connected with said voltage source inverter, said heater being adapted to be thermally coupled with a heatsink and/or with a direct bonded copper element of the voltage source inverter, said processor being adapted to control the heater such that the temperature of said direct bonded copper element and/or said heatsink is increased up to a maximum operative temperature, the processor being adapted to command a current pulses train in at least a phase of the voltage source inverter, wherein at each current pulse of said current pulses train the processor is adapted to collect, by said meter, sampled data comprising junction temperature values, current values, voltage values of at least one of said power semiconductor diode devices (DAu, DAd, DBu, DBd, DCu, DCd), said sampled data being collected in a sampling period wherein the corresponding power semiconductor switching device (SAu, SAd, SBu, SBd, SCu, SCd) connected with at least one of said power semiconductor diode devices (DAu, DAd, DBu, DBd, DCu, DCd) is turned-off by the processor, and wherein said processor is adapted to generate, from said sampled data, processed data comprising for at least one of said power semiconductor diode devices (DAu, DAd, DBu, DBd, DCu, DCd) the junction temperature values and the corresponding electric voltage and electric current values.

* * * * *